March 24, 1970 J. C. HAMBRIC 3,502,054
INTERNAL-COMBUSTION ENGINE
Filed Dec. 4, 1967 3 Sheets-Sheet 2

INVENTOR
JAMES C. HAMBRIC
BY Nilsson & Robbins
ATTORNEYS 3,502,054
INTERNAL-COMBUSTION ENGINE
James C. Hambric, Los Angeles, Calif., assignor to
K.M.F. Development Corporation, a corporation
of California
Filed Dec. 4, 1967, Ser. No. 697,253
Int. Cl. F02b 53/00
U.S. Cl. 123—13          11 Claims

ABSTRACT OF THE DISCLOSURE

A rotary engine is disclosed, in which a pair of synchronized rotors are driven by combustion to turn in intersecting, annular passages, the combustion gases expanding in spaces defined between radially extending lobes of the rotors and the walls of the annular passages. Combustion chambers, (removed from the annular passages) are provided for drive association with each of the rotors and are surfaced (along with the annular passages and to rotors) with material having a low thermal conductivity coefficient e.g. titanium, to enable very high temperature operation. The combustion chambers are of somewhat cylindrical form and receive a pair of opposed spark plugs (one at each end of the cylinder). The rotors are surface-etched and are somewhat hollow, defining internal cavities through which coolant is circulated. Coolant is also circulated through the engine housing to remove the heat therefrom which passes through the barrier material of low thermal conductivity. Commensurate with the temperature controlled operation of the engine, exhaust is provided through replaceable insulators which may comprise ceramic material. Other aspects of the engine, pertinent herein, include a particular gearing arrangement, a fuel-injection structure and provision for the coolant passages in the structure.

BACKGROUND AND SUMMARY OF THE INVENTION

Internal combustion engines have been proposed in the past in which a pair of rotors, carrying radially-extending lobes or abutments serve as both pistons and cylinder heads by revolving in a pair of intersecting annular passages. Specifically, for example, a structure of this type is shown and described in United States Patent 2,674,982 issued Apr. 13, 1954, to William B. McCall. Another patent covering certain improvement features of such an engine issued to the same inventor on Oct. 30, 1962, bearing the Number 3,060,910.

In general, engines of this type are capable of efficiently providing vibration-free balanced rotary motion, utilizing relatively few parts yet affording very good reliability. Furthermore, such engines may operate very cleanly, requiring relatively little maintenance and may be constructed to develop considerable power in relation to their weight.

Although internal combustion engines of the type described possess many advantages, they have not generally come into widespread use, primarily because of the vast amount of engineering effort that has been expended in perfecting various prior forms of reciprocating engines to their present stage of development. As a result, in spite of the numerous advantages apparent for engines of the type under consideration above, a need exists for even greater efficiency and higher standards of performance to compete effectively with existing production engines. It is therefore an object of the present invention to provide an engine of the general class described above, capable of attaining such improved economy and performance, as well as clean operation with regard to exhaust gas.

In general, the present invention specifically contemplates providing a heat barrier on various internal engine surfaces that are exposed to combustion, including the surfaces of a pair of chambers (offset from the annular passages) afforded to accommodate opposed spark plugs that will accomplish non-detonating combustion. To provide further heat control, and thus enable high temperature operation to improve performance, a coolant path is provided, that is somewhat critically disposed within the engine to include the rotors. Furthermore, the surfaces of the rotors are chemically milled to accomplish a lattice defining an infinite series of labyrinth passages for reduced leakage about the rotors.

BRIEF DESCRIPTION OF THE DRAWINGS

An embodiment of the present invention is described herein with reference to the appended drawings which also form a part of the specification, and in which:

FIGURE 3 is a sectional view taken along line 3—3 of FIGURE 2; and

DESCRIPTION OF THE ILLUSTRATIVE EMBODIMENT

Figure 1:
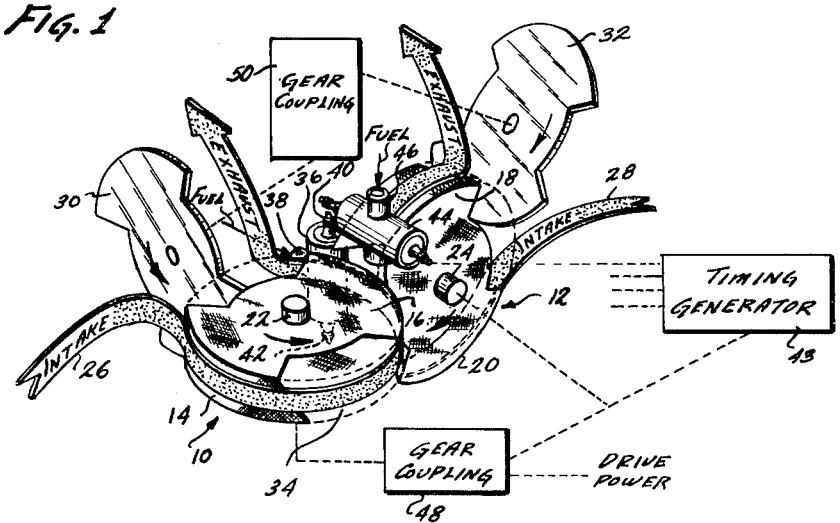
FIGURE 1 is a perspective and diagrammatic representation illustrative of the operation of an engine constructed in accordance with the principles of the present invention.

Referring initially to FIGURE 1, there is shown a pair of meshed rotors 10 and 12 (mounted for rotation about axes that are in perpendicular relationship). At their outer peripheries, these rotors define lobes which function both as pistons and as heads in the internal combustion engine. That is, specifically, the periphery of the rotor 10 defines radially-extending lobes 14 and 16 while the rotor 12 defines similar lobes 18 and 20. The leading and trailing edges of these lobes are tapered to accommodate a closely intermeshed synchronous motion between the lobes as the rotors 10 and 12 revolve on the perpendicular axial shafts, indicated at 22 and 24. Thus, when the rotors 10 and 12 are enclosed by a housing (not shown in FIGURE 1) closed chamber or cavities, are developed between the rotors which cavities may be expansively driven to provide drive power on the edges of the lobes as described in considerable detail in the above-referenced patents.

Considering the basic operation of engines of this type in somewhat more detail, a combustion-and-exhaust flow path for the rotor 10 is generally indicated by an arrow 26. An arrow 28 provides a similar indication for the rotor 12. It is to be noted, that for illustration, these paths (defined by the arrows 26 and 28) are shown to be continuous; however, in fact the gas flow is intermittent, in charges carried between the lobes. The movement paths of the gas are prevented from closing, by rotary, arcuate valve plates 30 and 32 which separate intake from exhaust.

During rotation of the rotor 14 (in a counterclockwise direction, as depicted), a charge of air is carried in a cavity 34 (between the ends or faces of the lobes 14 and 16) for compression at a location beyond the meshing intersection of the rotors 10 and 12. Specifically, the air charge is forced into a generally-cylindrical vertical combustion chamber 36 (rear of the engine) which receives fuel as indicated, through an injection port 38. The fuel, atomized in the air charge, is then ignited by a pair of spark plugs 40 and 42 that are affixed in the ends of the generally-cylindrical chamber 36 and are connected to a timing generator 43, one well known form of which may comprise simply an automotive-engine distributor.

The expanding gases from the combustion, in the chamber 36 move to encounter: the housing walls of the enclosure (not shown) a side surface of the lobe 20 on the rotor 12, and a radial end surface of the lobe 16. The force applied to the side surface of the lobe 20 represents a transverse or axial force on the rotor 12 which has substantially no effect but to contain the combustion products for enforced application to the radial surface of the lobe 16 which is thus yieldably driven.

As the gaseous products of combustion expand and drive the rotor 10, as indicated, they are expended and dispensed as exhaust from the rotary channel as indicated by the arrow 26. It is to be noted, that the rotary valve 30 segregates the spent exhaust products of combustion from the fresh charge of air that is received for another combustion. The operation of the rotor 12 is similar to that described above for the rotor 10, which is somewhat apparent in view of the symmetry of the two rotors. Specifically, a charge of air is accepted between the lobes of the rotor 12 for compression into a chamber 44 along with atomized fuel which is supplied through a port 46. The charge is then ignited to drive the rotor 12.

In operation, the perpendicular shafts 22 and 24 upon which the rotors 10 and 12 are carried respectively, are interconnected by a gear-system coupling 48 from which drive power is provided. The rotary valve plates 30 and 32 are also coupled to the shaft 22 through a gear-system coupling 50, all as indicated by conventional dashed lines. The gear-system couplings 48 and 50 spnchronize the movements of the rotors 10 and 12 along with movements of the valve plates 30 and 32 and are considered in structural detail below. In this regard, it will be apparent that relatively close-tolerance synchronization is required.

Figure 4:
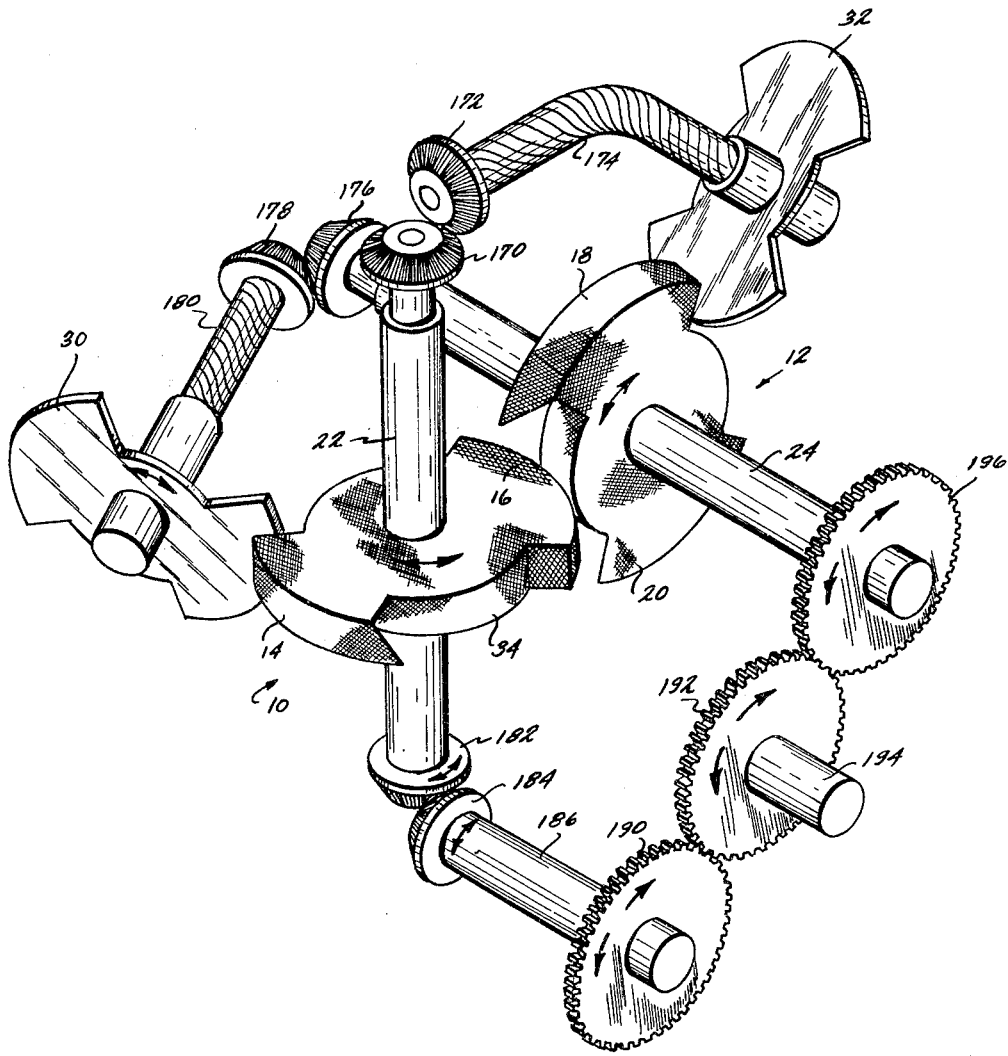
FIGURE 4 is a perspective and diagrammatic representation of a gearing system of the engine of FIGURE 2, and as represented in FIGURE 1.

In general, the improvements hereof, with respect to the prior art, relate to: the provision of the combustion chambers 36 and 44, the chemically milled surfaces of the rotors for improved sealing relationship, the structure for controlling heat flow to accomplish high temperature operation, along with regulating temperatures within the components of the engine; the details of the intercoupling 48 (wherein only one bevel gear is required); and the integral engine embodying such structure. For further explanation, of various aspects hereof, reference will now be made to a detailed embodiment of the engine as shown in FIGURES 2, 3 and 4 hereof, in which component parts previously identified with reference to FIGURE 1 bear similar reference numerals.

Figure 2:
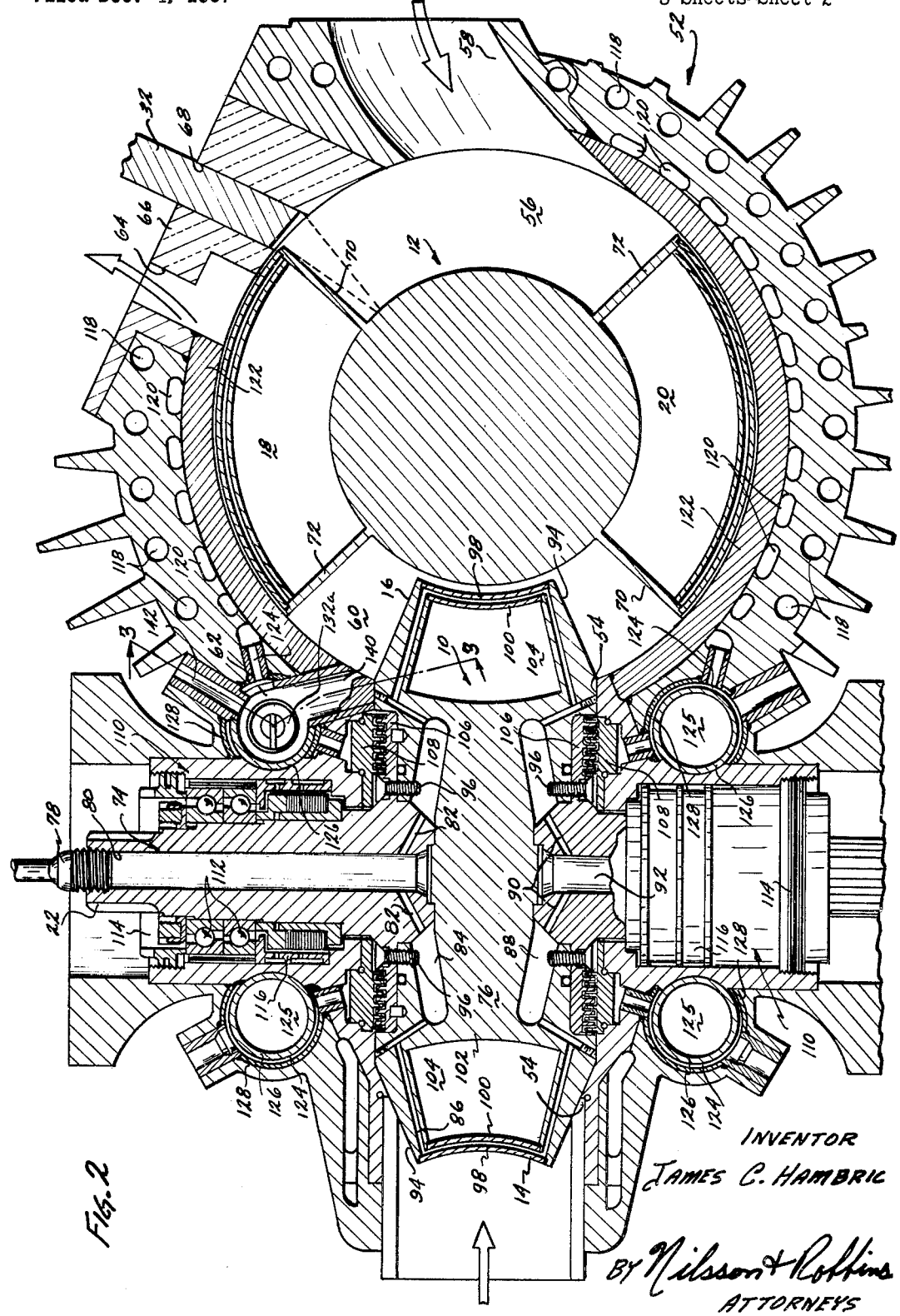
FIGURE 2 is a detailed sectional view taken somewhat centrally through a complete engine as diagrammatically represented in FIGURE 1.

Considering the engine as shown in FIGURE 2 a somewhat symmetrical housing 52 defines two intersecting, perpendicular annular cavities 54 and 56 in which the perpendicular rotors 10 and 12 are mounted for movement. These cavities are ported to afford intake and exhaust for the gas-drive spaces that are developed as the rotors 10 and 12 are driven. That is, for example, the portion of the housing containing the rotor 12 includes an intake port 58 (extreme right) through which charges of air are drawn into the spaces between lobes 18 and 20. These lobes, as explained above, pass through a meshing or intersecting motion pattern with the lobes 14 and 16 of the rotor 10 to accomplish a power-output drive as explained in considerable analytical detail in the above-identified patents. Generally, in this regard, power is applied to the rotor 10 and the rotor 12 by gases expanding into a space 60 (drawing center) from a combustion chamber 62, shown above.

The structural provision of the combustion chamber 62 affords substantial improvement in the volumetric efficiency of the engine and tends to avoid powerless detonation-type combustion. Rather, expanding gases from a chamber 62 flow into the space 60 applying a drive force to the lobe 18 until the energy of the expanding gases is substantially depleted, after which these gases are exhausted through a port 64.

It is to be noted, that exhaust port 64 is defined by a ceramic insert 66 which also defines the arcaute operating passage 68 for the valve plate 32 as described above. Of course, the valve plate 32 is mechanically coupled for rotation in synchronism with the rotor 12 so that exhaust gases are forced from the port 64, after which the synchronized movement of the valve plate 32 presents an opening through which the lobe 18 passes.

Considering the detailed structure somewhat further, the two rotors 10 and 12, operating in meshed relationship, are generally similar in size and shape. That is, the leading edges 70 of the lobes are forwardly tapered with reference to the axis of rotation of the rotors while the trailing edges 72 are similarly tapered to be parallel. These tapered edges (FIGURE 1) accomplish keenly-fitted merging relationship between the rotors 10 and 12 at the location where the annular cavities 54 and 56 intersect.

Structurally, the rotors 10 and 12 are hollow and are temperature controlled by a circulating fluid coolant. Additionally, these members are formed of material having a very low coefficient of heat conductivity to accomplish a high internal operating temperature and are surface-faced with criss-crossing grooves of .005 to .007 inch in width and depth (FIGURE 4). In structure, the rotors include a central, axial-rotation section 74 (FIGURE 2, left) a web section 76 and the external radial lobes 14 and 16. The axial section 74 contains a concentric cooling passage which is connected through rotary fluid couplings 78 to a source of circulating fluid coolant. The passage 74 is ported at the web section 76 to provide a fluid path through the entire rotor and its lobes. Specifically, fluid flow is: through the passage 80 (in the axial section 74), then to the ports 82, and through openings 84 to channels 86 which are near the surface of the rotor lobes. From the channels 86, the cooling fluid passes to openings 88 and is returned to the source of circulating coolant through ports 90 and the passage 92, terminated in a rotary coupling (not shown).

It is to be noted, that the rotor structure 10 is integrally formed by the number of separate component parts. That is, the axial section 74, the web 76 and part of the lobes may comprise a single casting to which lobe sides 94 are affixed by studs 96. The sides 94 are then joined at their peripheral edges by plates 98 (at the radial exterior of the rotors) to thus define the exterior sides of the coolant channels 86. The interior sides of the channels 86 are closed by similar plates 100 welded to the central casting 102 of the rotor which integrally includes the axial section 74 and the web 76. The interior plates 100 of the rotor lobes also enclose an interior space 104 which effectively lightens the lobes and reduces rotor imbalance. That is, by providing the rotor lobes hollow, improved weight-distribution and balance characteristics are somewhat simplified.

It is to be noted, that the rotors incorporate sections of annular extensions 106, located on each side of each rotor concentrically within the arcuate lobes 14 and 16. These extensions 106 or rings are matingly received in inserts 108 that are affixed to the primary housing of the engine. Of course, the rotors are also carried on symmetrical bearing structures 110 (FIGURE 2) the upper part of which is shown in section. The bearing structures 110 include a pair of ball bearings 112 (upper left) axially held within the housing by an externally-threaded collar 114. Below the bearings 112 a lubricating ring 116 is held snugly between the primary housing 52, and the axial section 74 of the rotor.

Considering the housing 52 in somewhat greater detail, it is to be noted that the intersecting annular cavities 54 and 56 defined within the housing are surfaced with titanium by means of fitted inserts. In this regard, the use of titanium, as an exemplary material of low heat-carrying capacity, and high-heat tolerance, greatly improves the operating temperature of the engine with attendant improvement in performance. That is, more specifically, it has been discovered that by utilizing surface material (and support material as well if desired) of high heat tolerance and having a heat conductivity of less than 10 B.t.u./hour/square foot/°/F./foot, (e.g. titanium) entirely-altered and quite unexpected engine capability is developed. That is, operating engine temperatures are attained which provide vastly improved performance with regard both to efficiency and cleanliness. Furthermore, the housing 52 also carries circulating coolant to remove that heat which does pass through the titanium heat barrier. Radiating fins provided on the exterior of the housing are also useful in this regard.

Temperature control of the engine is accomplished by coolant flowing through exterior channels 118 and interior channels 120 formed within the circular sections of the housing 52. In this regard, the interior channels 120 are contiguous to an annular insert 122, which is formed of titanium and functions as a heat barrier.

From the coolant channels 118 and 120, the circulating fluid also passes through a space 124 about the combustion chamber 62, and into dummy combustion chambers 125 which are defined within the housing but employed only for purposes of balance and cooling. The cooling passage or space 124 about the combustion chamber 62 is defined by an interior titanium cylinder 126 (FIGURE 3) and a concentric external cylinder 128. The space 124 is then connected for communication with a source of fluid coolant through ports 130 defined at the end of the housing.

Also shown in FIGURE 3, the combustion chamber 62 (generally cylindrical) is closed at its ends by spark plugs 132 and 132a. The plugs are received through abutting pairs of end closures 134 and 136. Each of the closures 134 contains a sealing O-ring 138 while the affixed closure 136 is threadably received in the cylinder 126. It is to be noted, that the spark plugs 132 are positioned at the ends of the combustion chamber (of generally cylindrical shape) to ignite the gasoline-air charge in facing opposition, thereby producing a generally non-detonating combustion. The gaseous products from such a combustion exhaust through the passage 140 into the annular cavity 56, (then closed by rotor lobes) to provide a driving force to the radial driving edge 72 (FIGURE 2) of the lobe 18. Thus, the engine rotors 10 and 12 are motivated to provide a drive power output on the associated perpendicular shafts.

The overall sequence of operation of the engine now may be best understood, in view of the above structural description, by assuming a stage of operation and describing the sequence from such a point forward, along with concurrent introduction of additional structural elements. In this regard, referring to FIGURE 2, the rotor 12 revolves in a clockwise direction accepting charges of air through the port 58 between the lobes 18 and 20. Each charge of air is moved through the annular cavity 56 toward the location of rotor intersection, at which the lobe 16 enters the space of cavity 56 thereby tending to compress the charge of air forcing it into the combustion cylinder 126, the component positions being substantially as depicted in FIGURE 2.

Next, a charge of fuel is forced through the passage 142 into the combustion cylinder as through a fuel injection nozzle as well known in the prior art. The fuel is substantially atomized within the charge of air and is at that stage ignited by the spark plugs 132 and 132a (FIGURE 3).

In view of the manner in which the fuel is ignited, and the form of the containing cavity, a substantially non-detonating combustion takes place causing the products of combustion to flow through the port 140 into the space between the side of the lobe 16 (FIGURE 2) and the end or trailing edge 72 of the lobe 18. As a result, a driving force is applied to the lobe 18 causing it to revolve in a clockwise direction. Of course, similar combustion drive occurs to propel the rotor 14, combustion occurring in the chamber 36 (FIGURE 1). As a result, the two rotors 10 and 12 are cyclically motivated to provide rotary output drive power.

Of course, the revolving shafts 22 and 24 (FIGURE 1) may be variously synchronized and interconnected to the plates 30 and 32, the timing generator 43 and an output drive shaft. However, an exemplary specific system of gearing is shown and described in FIGURE 4, and will be described below. However, preliminarily, recapitulating, the rotors 10 and 12 must be closely coupled for synchronized motion. Furthermore, the coupling between these rotors also provides the power output from the engine while other coupling is provided from the rotors 10 and 12 to the plates or gate valves 30 and 32 respectively. In these regards, the gearing arrangement hereof, as disclosed in FIGURE 4 is significantly advantageous by reason of the fact that only one pair of bevel gears exists in the power train and relatively few gears exist in the entire system.

The rotors 10 and 12 (FIGURE 4) are shown carried on shafts 22 and 24 respectively which are rotatably mounted in substantially perpendicular relationship. One end of each of these shafts carries a bevel gear for engagement with a similar gear that is connected through a flexible shaft to an associated one of the valve plates 30 or 32. Specifically, the shaft 22 terminates (at its upper end) in a bevel gear 170 which meshes with a mating bevel gear 172 carried on a flexible shaft 174 which is coupled to the valve plate 32. In a somewhat similar manner the horizontal shaft 24 carries a bevel gear 176 which mates with the gear 178 that is carried on a flexible shaft 180, and which drives the valve plate 30.

Regarding the various gears and shafts illustrated in FIGURE 4, bearings, brackets and the like for supporting these members are not included in the interest of preserving the drawing legible. However, the provision of such bearings and supports as somewhat depicted in FIGURE 2, will be readily apparent to those skilled in the art from the disclosure herein.

The ends of the shafts 22 and 24 opposite from those considered above (lower and right) are interconnected to provide the drive output. Specifically, the shaft 22 (at its lower end) carries a bevel gear 182 coupled to a mating gear 184 (the only pair in the power train) which is carried on a horizontal shaft 186. The shaft 186 then receives a spur gear 190 which meshes with the power gear 192 to drive the output shaft 194. Somewhat similarly, the shaft 24 from the rotor 12 is connected to the output shaft through a spur gear 196 which is meshed with the gear 192.

In considering the gear train as shown in FIGURE 4, several features are particularly significant. First, by employing the flexible shafts 174 and 180 to couple the rotors to the valve plates, several production problems are substantially eliminated. Specifically, alignment and tolerance difficulties are substantailly reduced. Furthermore, in the structure as shown in FIGURE 4, the use of a single pair of bevel gears (gears 182 and 184) operates to a substantial advantage as prior systems of this type have generally included a plurality of these relatively expensive structures. As a further consideration, it is to be noted that the entire gearing system (FIGURE 4) is relatively simple and therefore may be economically manufactured and inexpensively maintained.

What is claimed is:
1. A rotary internal combustion engine comprising:
   a housing defining two intersecting annular passages;
   a pair of rotors, the first of which includes at least one radial lobe for rotation in one of said annular passages and the second of which includes at least one radial lobe for rotation in the other of said annular passages;
   means for synchronizing the rotation of said rotors whereby to accommodate the passage of said lobes through the intersection of said passages;

means integral with said housing, defining first and second somewhat cylindrical combustion chambers axially parallel to said rotors each of which are offset from the intersection of said passages and which communicate with said intersection; and means for providing expanding gases of combustion in said combustion chambers whereby to drive said rotors including two pairs of spark plug devices, one of each being mounted at an end of said cylindrical combustion chambers.

2. A rotary internal combustion engine according to claim 1 wherein means for synchronizing said rotors consists of a single bevel gear and a spur train interconnecting said rotors.

3. A rotary internal combustion engine according to claim 1 wherein said means defining said annular passages and said combustion chambers include means for providing an internal surface thereon of a material having a thermal heat conductivity of less than 10 B.t.u./hr./sq. ft./° F./ft.

4. A rotary internal combustion engine according to claim 3 wherein said rotors are surfaced with a like material to said internal surface material.

5. A rotary internal combustion engine according to claim 3 wherein said material comprises titanium.

6. A rotary internal combustion engine according to claim 1 wherein said means for providing expanding gases includes at least one exhaust passage in said housing, defined by an insulator structure received in said housing.

7. A rotary internal combustion engine according to claim 1 wherein said rotors define internal cavities.

8. A rotary internal combustion engine according to claim 7 further including means for circulating fluid coolant within said internal cavities of said rotors.

9. A rotary internal combustion engine according to claim 8 wherein said means defining said combustion chambers defines somewhat cylindrical chambers axially parallel to said rotors and wherein said means for providing expanding gases includes two pairs of spark plug devices, one of each being mounted at an end of said cylindrical chambers.

10. A rotary internal combustion engine according to claim 9 wherein said rotors, the interior annular passages of said housing and said means defining said first and second combustion chambers are faced with titanium.

11. A rotary internal combustion engine according to claim 10 wherein said means for providing gases includes at least one exhaust passage in said housing, defined by an insulator structure received in said housing.

References Cited

UNITED STATES PATENTS

| | | | |
|---|---|---|---|
| 1,828,207 | 10/1931 | Stone. | |
| 2,674,982 | 4/1954 | McCall. | |
| 2,779,318 | 1/1957 | Strader. | |
| 2,869,516 | 1/1959 | Heiman. | |
| 2,978,360 | 4/1961 | Bradstreet et al. | 117—104 |
| 3,060,910 | 10/1962 | McCall | 123—12 |
| 3,152,523 | 10/1964 | Whitfield et al. | 92—213 |
| 3,170,444 | 2/1965 | Haddon | 123—41.34 |
| 3,227,242 | 1/1966 | Mattoon | 181—61 |

FOREIGN PATENTS 1,200,933  7/1959  France.

LAURENCE M. GOODRIDGE, Primary Examiner

U.S. Cl. X.R.

123—41.34, 191